United States Patent
D'Penha et al.

(10) Patent No.: US 10,345,855 B2
(45) Date of Patent: Jul. 9, 2019

(54) PARABOLIC-SHAPED RECEPTACLE FOR A COMPUTING DEVICE WITH AN AUDIO DELIVERY COMPONENT

(71) Applicant: Language Line Services, Inc., Monterey, CA (US)

(72) Inventors: Lindsay D'Penha, Carmel, CA (US); Jeffrey Cordell, Carmel, CA (US)

(73) Assignee: Language Line Services, Inc., Monterey, CA (US)

( * ) Notice: Subject to any disclaimer, the term of this patent is extended or adjusted under 35 U.S.C. 154(b) by 29 days.

(21) Appl. No.: 15/483,455

(22) Filed: Apr. 10, 2017

(65) Prior Publication Data
US 2018/0295431 A1    Oct. 11, 2018

(51) Int. Cl.
| | |
|---|---|
| *H04R 1/02* | (2006.01) |
| *G06F 1/16* | (2006.01) |
| *H04R 1/34* | (2006.01) |
| *H04R 5/02* | (2006.01) |

(52) U.S. Cl.
CPC ............ *G06F 1/1632* (2013.01); *H04R 1/342* (2013.01); *H04R 5/02* (2013.01); *H04R 1/345* (2013.01); *H04R 2201/025* (2013.01); *H04R 2205/021* (2013.01)

(58) Field of Classification Search
CPC .......... H04R 1/025; H04R 1/04; H04R 1/403; H04R 2420/09; G06F 1/1632
USPC ........ 381/300–305, 332–334, 336, 339, 352, 381/160, 357, 361, 363, 366, 388
See application file for complete search history.

(56) References Cited

U.S. PATENT DOCUMENTS

| | | | |
|---|---|---|---|
| 2008/0110692 A1* | 5/2008 | Moore | H04R 1/2865 181/156 |
| 2010/0219012 A1* | 9/2010 | Baumbach | G10K 11/025 181/177 |
| 2013/0170686 A1* | 7/2013 | Lester, Jr. | H04R 1/2803 381/338 |
| 2014/0116632 A1* | 5/2014 | Domash | A47C 7/62 160/369 |
| 2015/0260333 A1 | 9/2015 | Polyakov et al. | |

* cited by examiner

*Primary Examiner* — Norman Yu
(74) *Attorney, Agent, or Firm* — Patent Ingenuity, P.C.; Samuel K. Simpson

(57) ABSTRACT

A parabolic-shaped receptacle is provided. The parabolic-shaped receptacle has a frame having a left side that has a left parabolic curvature and a right side that has a right parabolic curvature. Further, the parabolic-shaped receptacle has one or more speaker ports. In addition, the parabolic-shaped receptacle has a coupling mechanism that couples a computing device to the frame such that one or more speakers of the computing device are aligned with the one or more speaker ports to deliver audio from the one or more speakers through the one or more speaker ports. The parabolic-shaped receptacle also has a left receptacle speaker positioned on the frame along the left parabolic curvature to the left of the one or more speaker ports. Further, the parabolic-shaped receptacle has a right receptacle speaker positioned on the frame along the right parabolic curvature to the right of the one or more speaker ports.

19 Claims, 11 Drawing Sheets

PARABOLIC-SHAPED RECEPTACLE FOR A COMPUTING DEVICE WITH AN AUDIO DELIVERY COMPONENT

BACKGROUND

1. Field

This disclosure generally relates to the field of audio delivery. More particularly, the disclosure relates to a receptacle that receives a computing device with an audio delivery component.

2. General Background

With the increasing use of computing devices, various outlets (e.g., stores, shopping centers, conference centers, etc.) provide users with the ability to perform tasks at physical locations through such devices. For instance, kiosks physically situated in stores allow users to purchase items, view account information, provide payment, etc.

Yet, such kiosks are typically limited in the amount of data that can be provided to users in auditory form for a variety of reasons. Firstly, kiosks are typically located in busy areas that are prone to significant amounts of noise; such an environment is not conducive to effectively providing a user with data. To counteract such effects, users may have to have information repeated or may even discontinue use of the kiosk. Secondly, the audio emanating from kiosks is typically so widespread that other users can easily hear data only intended for the user at a kiosk—a significant privacy concern.

As a result, audio delivery components situated at conventional kiosks are ineffective for providing quality audio to users. Therefore, current audio hardware components do not filter noise adequately for an optimal user experience.

SUMMARY

A parabolic-shaped receptacle is provided. The parabolic-shaped receptacle has a frame having a left side that has a left parabolic curvature and a right side that has a right parabolic curvature. Further, the parabolic-shaped receptacle has one or more speaker ports. In addition, the parabolic-shaped receptacle has a coupling mechanism that couples a computing device to the frame such that one or more speakers of the computing device are aligned with the one or more speaker ports to deliver audio from the one or more speakers through the one or more speaker ports. The parabolic-shaped receptacle also has a left receptacle speaker positioned on the frame along the left parabolic curvature to the left of the one or more speaker ports. The left receptacle speaker receives the audio from the one or more speaker ports and delivering the audio to one or more users positioned in front of the left parabolic curvature. Further, the parabolic-shaped receptacle has a right receptacle speaker positioned on the frame along the right parabolic curvature to the right of the one or more speaker ports. The right receptacle speaker receives the audio from the one or more speaker ports and delivering the audio to the one or more users positioned in front of the right parabolic curvature.

Alternatively, another parabolic-shaped receptacle is provided. The parabolic-shaped receptacle has a frame having a left side that has a left parabolic curvature and a right side that has a right parabolic curvature. Further, the parabolic-shaped receptacle has a microphone port. In addition, the parabolic-shaped receptacle has a coupling mechanism that couples a computing device to the frame such that a microphone of the computing device is aligned with the microphone port to receive audio from the one or more speakers through the microphone port. The parabolic-shaped receptacle also has a left receptacle speaker positioned on the frame along the left parabolic curvature to the left of the microphone port. The left receptacle speaker receives the audio from one or more users positioned in front of the left parabolic curvature and delivering the audio to the microphone port. In addition, the parabolic-shaped receptacle has a right receptacle speaker positioned on the frame along the right parabolic curvature to the right of the microphone port. The right receptacle speaker receives the audio from one or more users positioned in front of the right parabolic curvature and delivering the audio to the microphone port.

As yet another alternative, another parabolic-shaped receptacle is provided. The parabolic-shaped receptacle has a frame having a left side that has a left parabolic curvature and a right side that has a right parabolic curvature. Further, the parabolic-shaped receptacle has one or more speaker ports. In addition, the parabolic-shaped receptacle has a coupling mechanism that couples a computing device to the frame such that one or more speakers of the computing device are aligned with the one or more speaker ports to deliver audio from the one or more speakers through the one or more speaker ports. The parabolic-shaped receptacle also has a left receptacle speaker positioned on the frame along the left parabolic curvature to the left of the one or more speaker ports. The left receptacle speaker receives the audio from the one or more speaker ports and delivering the audio to one or more users positioned in front of the left parabolic curvature. In addition, the parabolic-shaped receptacle has a right receptacle speaker positioned on the frame along the right parabolic curvature to the right of the one or more speaker ports. The right receptacle speaker receives the audio from the one or more speaker ports and delivering the audio to the one or more users positioned in front of the right parabolic curvature. The parabolic-shaped receptacle also has a left privacy panel. Further, the parabolic-shaped receptacle has a left privacy panel coupling mechanism that couples the left panel to the frame such that the left panel is positioned to deflect audio emanating from the left receptacle speaker toward the one or more users. In addition, the parabolic-shaped receptacle has a right privacy panel. The parabolic-shaped receptacle also has a right privacy panel coupling mechanism that couples the right panel to the frame such that the right panel is positioned to deflect audio emanating from the right receptacle speaker toward the one or more users.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

As an alternative embodiment.

DETAILED DESCRIPTION

A parabolic-shaped receptacle for a computing device is provided to help optimize the audio experience for a user of the computing device. The parabolic-shaped receptacle focuses audio emanating from the computing device toward the user of the computing device and filters out surrounding noise; as a result, the user can effectively listen to the audio emanating from the computing device.

Accordingly, the parabolic-shaped receptacle improves the delivery of audio to the user so that a user can avoid having to provide multiple requests for the same audio data. Further, the privacy of the audio delivery is enhanced as the audio is difficult for others not situated at the audio focal point to hear.

For example, the parabolic-shaped receptacle may be used in a language interpretation/translation environment where privacy of user data may be paramount. For instance, a user speaking a first language (e.g., Spanish) may be unable to communicate effectively with a store representative speaking a second language (e.g., English) at a physical store location. The parabolic-shaped receptacle may be situated in the store to receive a mobile computing device (e.g., a tablet device, smartphone, etc.) that provides remote access to a language interpreter/translator via a computerized network for the user and the store representative; the audio delivery of such access is provided in a focused manner so that only the user and the store representative are effectively able to hear the audio in a filtered manner so that the audio delivery is not intermixed with noise from surrounding customers, representatives, etc.

The example of the parabolic-shaped receptacle being implemented in a store environment for language interpretation/translation is provided only as an example; the parabolic-shaped receptacle may be used in other environments for other purposes. For instance, the parabolic-shaped receptacle may be implemented in shopping centers that are typically noisy environments.

Figure 1A:
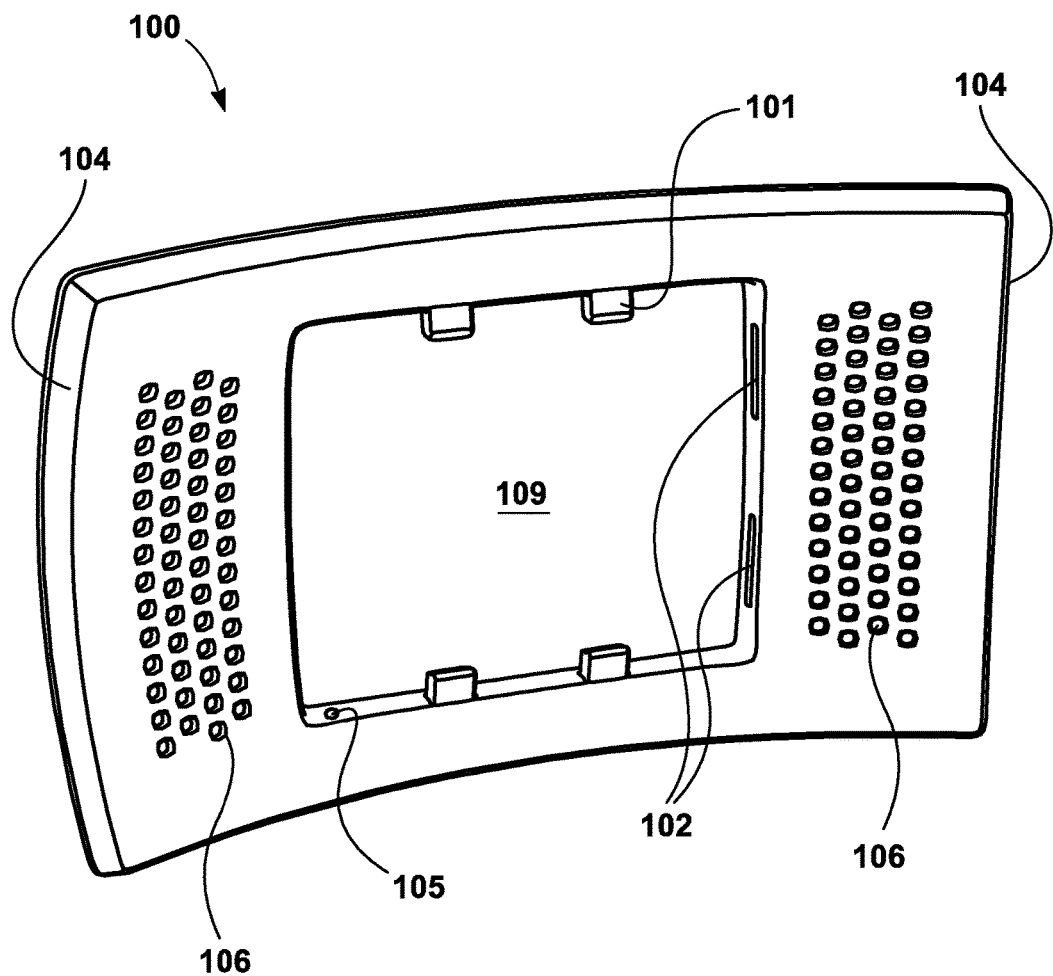
FIG. 1A illustrates a perspective view of a parabolic-shaped receptacle that filters audio emanating from a computing device.
Figure 2A:
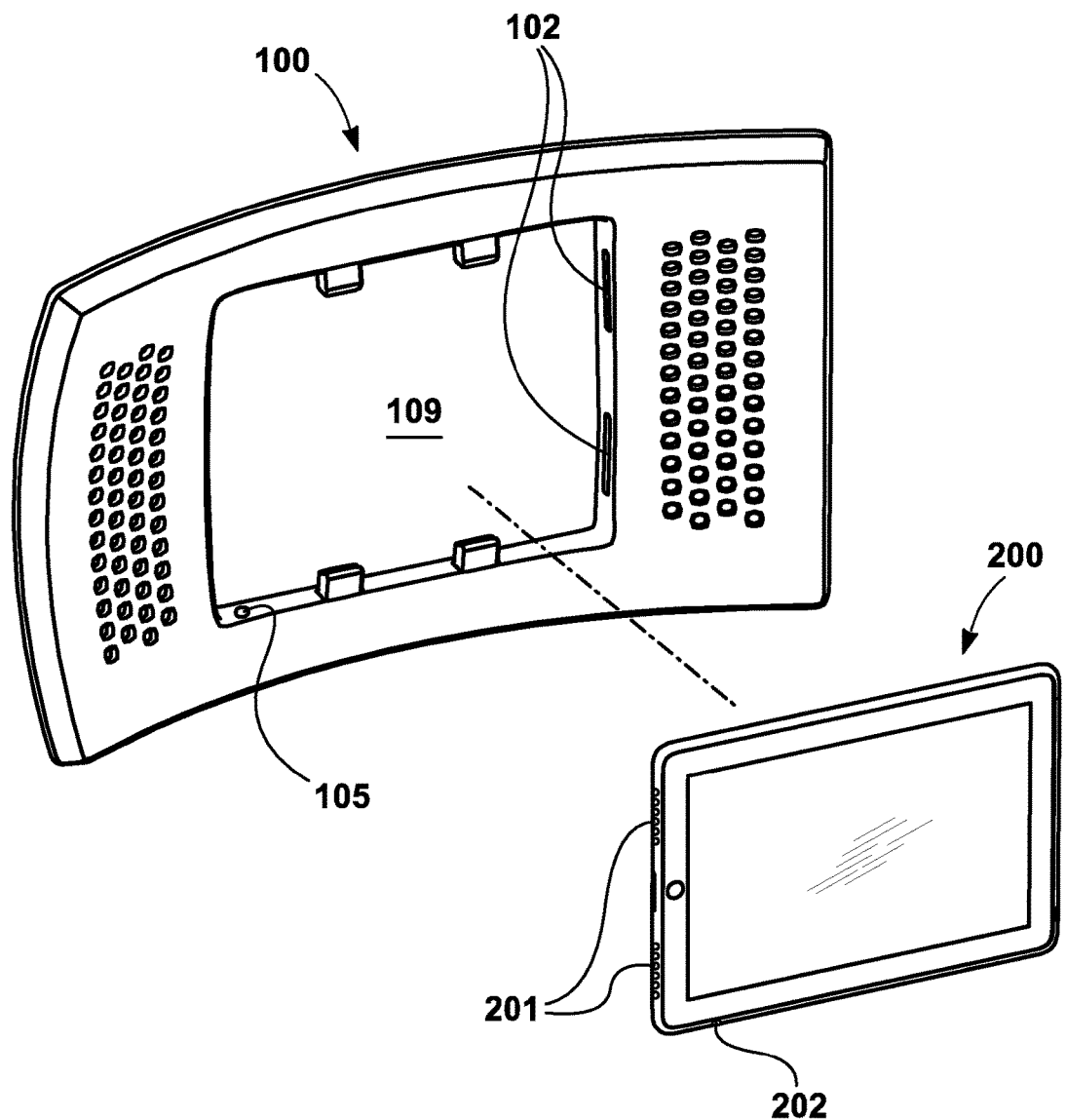
FIG. 2A illustrates a perspective view of the computing device that may be positioned within the parabolic-shaped receptacle illustrated in FIGS. 1A and 1B.

FIG. 1A illustrates a perspective view of a parabolic-shaped receptacle 100 that filters audio emanating from a computing device 200 (FIG. 2A). The parabolic-shaped receptacle 100 has one or more coupling mechanisms 101 (e.g., clips, fasteners, grooves, etc.) that are used to receive and keep the computing device 200 in place in a cavity 109 of the parabolic-shaped receptacle 100. Even though a cavity 109 is illustrated, the one or more coupling mechanisms 101 may be used to couple the computing device 200 to the parabolic-shaped receptacle 100 without the cavity 109 (e.g., via a flat surface, concave surface, convex surface, etc. of the parabolic-shaped receptacle 100).

Further, the parabolic-shaped receptacle 100 has one or more speaker ports 102 that receive audio from the computing device 200; the audio travels through the one or more speaker ports 102 and then through one or more sound tunnels 103 (FIG. 1B) that are shaped according to the parabolic curvature of the parabolic-shaped receptacle 100. The sound tunnels 103 effectively redirect the audio emanating from the computing device 200 (FIG. 2) to one or more users through one or more receptacle speakers 106. For illustration purposes, the receptacle speakers 106 are illustrated as having a plurality of holes but may be implemented without a plurality of holes (e.g., a geometrically-shaped opening that allows sound to emanate from the parabolic-shaped receptacle 100 and obviates cleaning a plurality of smaller holes). The one or more speaker ports 102 may be fully integrated into sides of the cavity 109, partially integrated into the sides of the cavity 109 and partially integrated into the rear of the cavity 109, and/or fully integrated into the rear of the cavity 109 depending on the position of the one or more speakers 201.

In one embodiment, a speaker port 102 surrounds an entirety of speakers 201 (FIG. 2A) of the computing device 200. In another embodiment, the speaker port 102 surrounds only one speaker; therefore, the one or more speaker ports 102 may each be configured to match the size of one or more speakers 201 of the computing device 200. In other words, the one or more speaker ports 102 may be a plurality of small holes that align with a plurality of small speaker ports 102. In yet another embodiment, the one or more speaker ports 102 may be adjusted to slide to different positions for different computing devices 200. For example, the one or more speaker ports 102 may be operably attached to a sliding device so that the one or more speaker ports 102 slide up, down, sideways, to the front, to the rear, etc. to match the position of the one or more speakers 201 of the computing device 200.

Further, a microphone port 105 may surround a microphone 202 (FIG. 2A) of the computing device 200. The audio may then travel inwardly from the users through the receptacle speakers 106 toward the one or more speaker tunnels 103 so that the sound is directed toward the microphone port 105 and then the microphone 202.

In other words, the parabolic-shaped receptacle 100 may be utilized to filter audio that is emanating from the computing device 200 (FIG. 2A) to enhance the listening experience of one or more users situated in front of the parabolic-shaped receptacle 100 or to filter audio that is directed from the one or more users situated in front of the parabolic-shaped receptacle 100 from external noise so that the audio for a recipient of the communication at a remote computing device is filtered.

Even though the parabolic-shaped receptacle 100 is illustrated as being capable of receiving the computing device 200, other embodiments allow for the parabolic-shaped receptacle 100 to have an integrated computing device 200. For example, the parabolic-shaped receptacle 100 may have a built-in computing device 200.

In one embodiment, the parabolic-shaped receptacle 100 also has one or more grips 104 (e.g., grooves) that a user can use to adjust the orientation of the parabolic-shaped receptacle 100. For examples, the grips 104 may be positioned on one or more sides of the curved portions of the parabolic-shaped receptacle 100. The user may then use the grips 104 to turn the parabolic-shaped receptacle 100 to direct the audio emanating from the computing device 200 (FIG. 2A) toward the user; in other words, the user may effectively steer the parabolic-shaped receptacle 100 when connected to a movable stand 300 (FIG. 3).

Figure 1B:
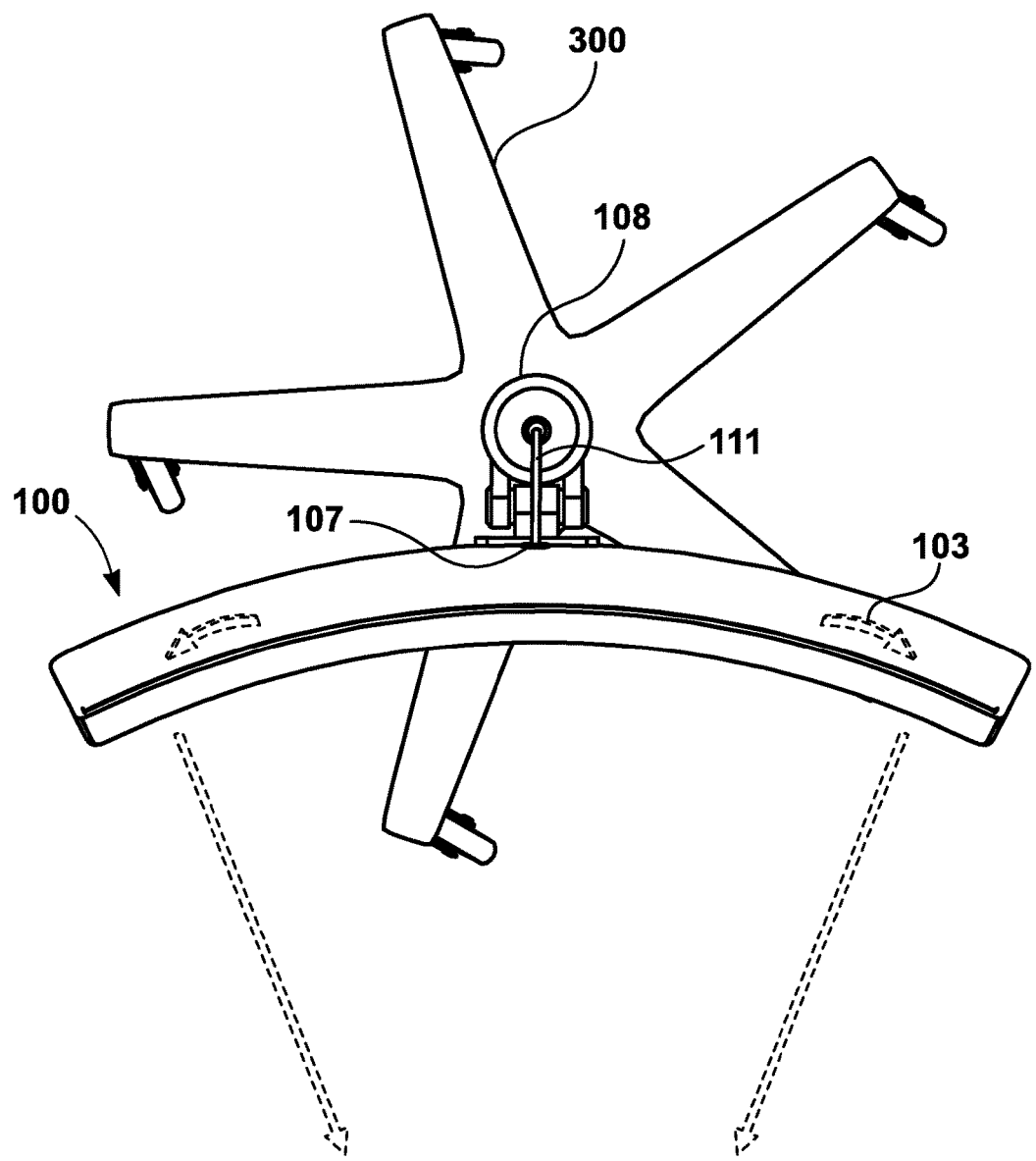
FIG. 1B illustrates a top view of the parabolic-shaped receptacle illustrated in FIG. 1A.

In another embodiment, the parabolic-shaped receptacle 100 has a wire channel 107 that allows for one or more cables 111 to be connected to the parabolic-shaped receptacle 100 without being bent, kinked, etc. For example, the wire channel 107 may be positioned in the rear portion of the parabolic-shaped receptacle 100 as illustrated in FIG. 1B but may also be situated in other areas of the parabolic-shaped receptacle 100 to provide effective and unobtrusive use of wires as needed for operation of the computing device 200 (FIG. 2). The wire channel 107 allows for power cord management; in other words, the wire channel 107 allows the computing device 200 to be powered with a cable 111 permanently installed and not kinked. The cable 111 may be used to provide power, data, communication, etc.

The parabolic-shaped receptacle 100 effectively provides focused and filtered audio (e.g., at a low speaker volume) without use of an external speaker (e.g., a BLUETOOTH speaker). A variety of materials may be used in the construction of the parabolic-shaped receptacle 100 to enhance the audio focusing and filtering aspects of the parabolic-shaped receptacle 100. For example, the parabolic-shaped receptacle 100 may be constructed as a hard plastic shell but other materials may be utilized instead.

FIG. 1B illustrates a top view of the parabolic-shaped receptacle 100 illustrated in FIG. 1A. Arrows are illustrated to depict the bidirectional travel of audio through the one or more speaker tunnels 103. Further, in one embodiment, a stand receiver port 108 is integrated in or attached to the parabolic-shaped receptacle 100 so that a static or movable stand 300 (FIG. 3) may be attached to the parabolic-shaped receptacle 100.

FIG. 2A illustrates a perspective view of the computing device 200 that may be positioned within the parabolic-shaped receptacle 100 illustrated in FIGS. 1A and 1B. The computing device 200 may be mobile (e.g., tablet device, smartphone, etc.) or static (e.g., a kiosk). The mobile configuration allows the computing device 200 to be positioned within the parabolic-shaped receptacle 100 whereas the static configuration allows the parabolic-shaped receptacle 100 to be positioned around the computing device 200 (e.g., as an audio shroud). Further, FIG. 2B illustrates a perspective view of the computing device 200 coupled to the parabolic-shaped receptacle 100.

Figure 3A:
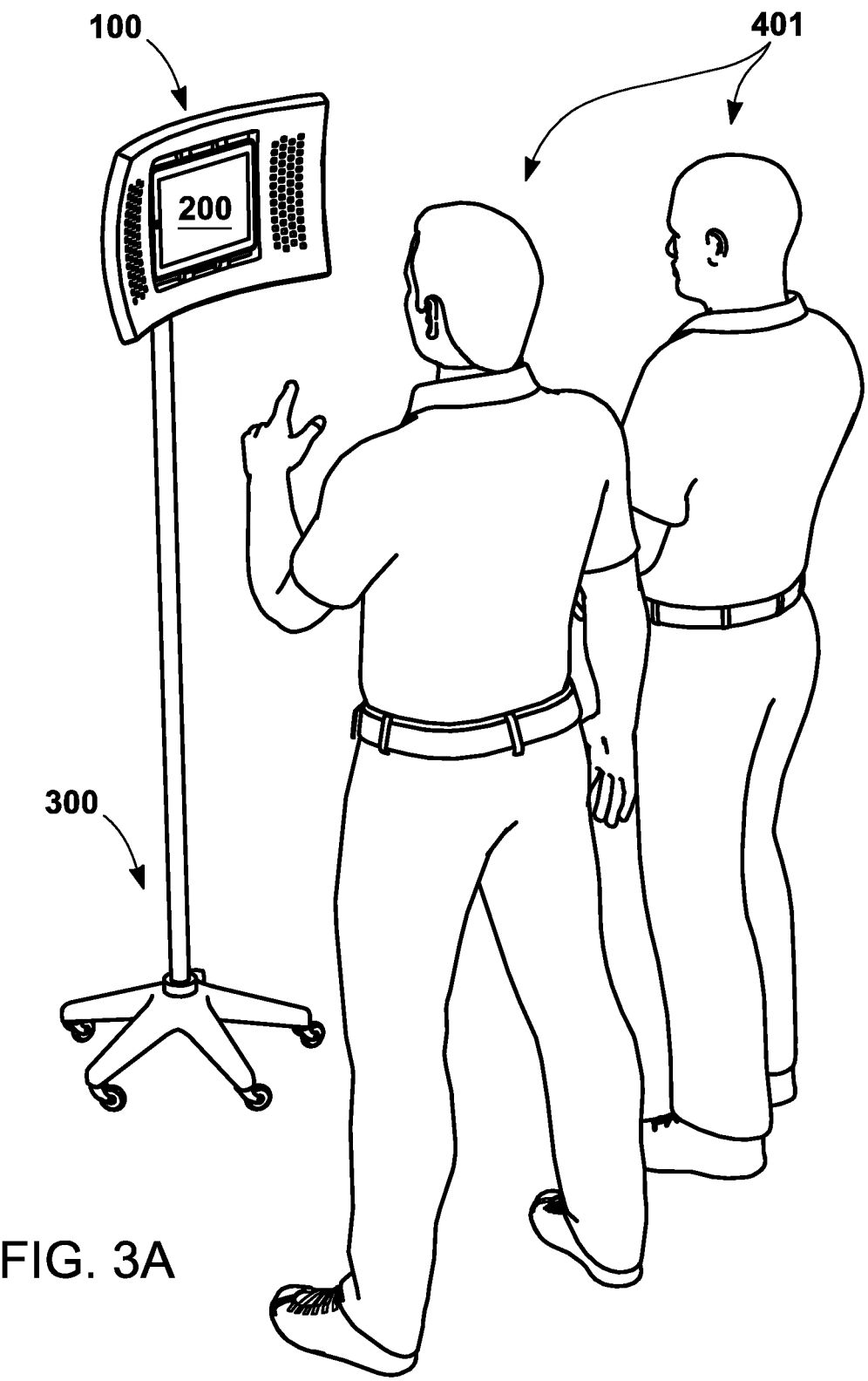
FIG. 3A illustrates perspective view of an example of the movable stand on which the parabolic-shaped receptacle may be positioned.

Further, FIG. 3A illustrates perspective view of an example of the movable stand 300 on which the parabolic-shaped receptacle 100 (FIG. 1A) may be positioned. The movable stand 300 allows one or more users to move the parabolic-shaped receptacle 100 to various positions within a particular environment. Further, the grips 104 (FIG. 1A) may be utilized by the user to steer the parabolic-shaped receptacle 100 to a location at which the all of the intended users are located, a location that is convenient for the users, etc. In addition, the grips 104 may be utilized by the user to adjust the orientation of the parabolic-shaped receptacle 100 for optimal viewing and listening via the computing device 200 (FIG. 2A).

Figure 2B:
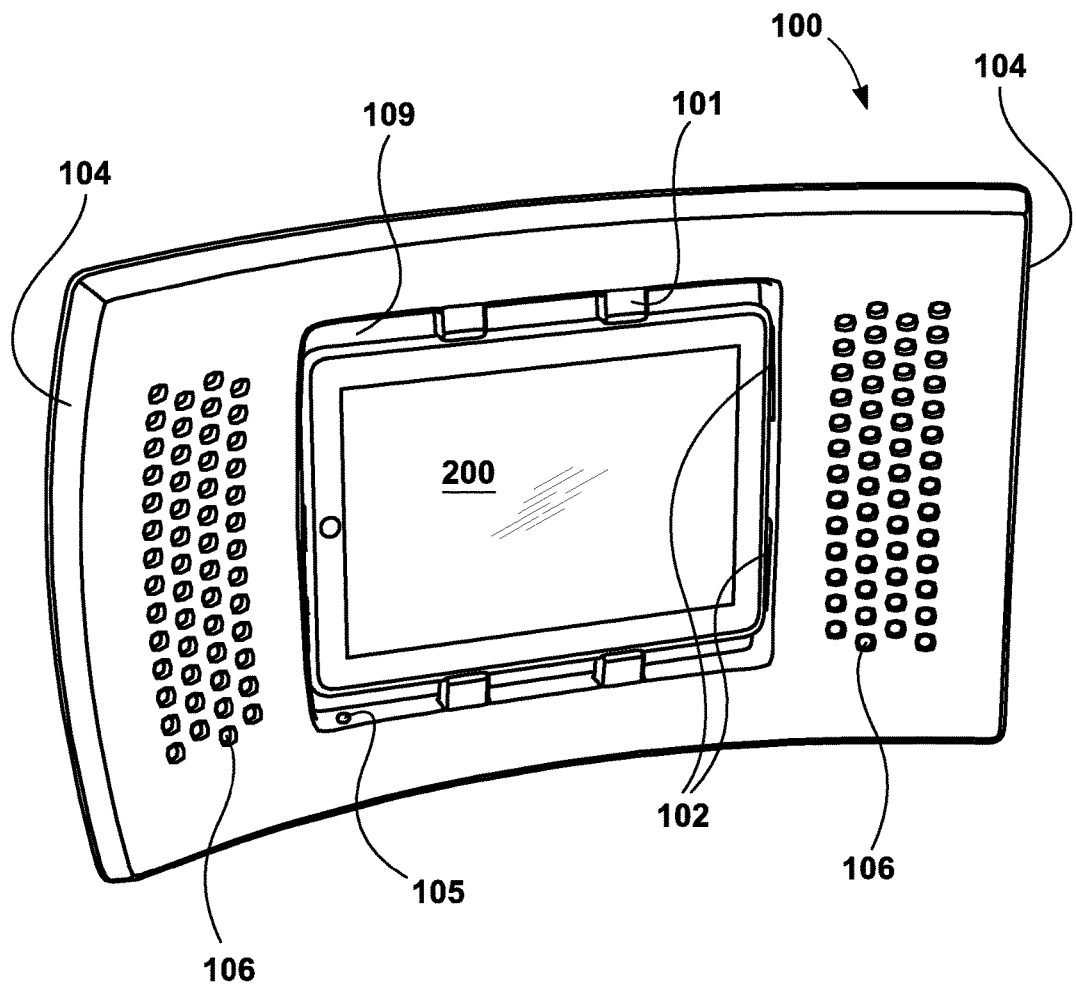
FIG. 2B illustrates a perspective view of the computing device coupled to the parabolic-shaped receptacle.

Further, a plurality of users 401 may use the parabolic-shaped receptacle 100 illustrated in FIGS. 1A and 1B in conjunction with the computing device 200 as illustrated in FIGS. 2A and 2B as situated on the movable stand 300 illustrated in FIG. 3A.

Figure 3B:
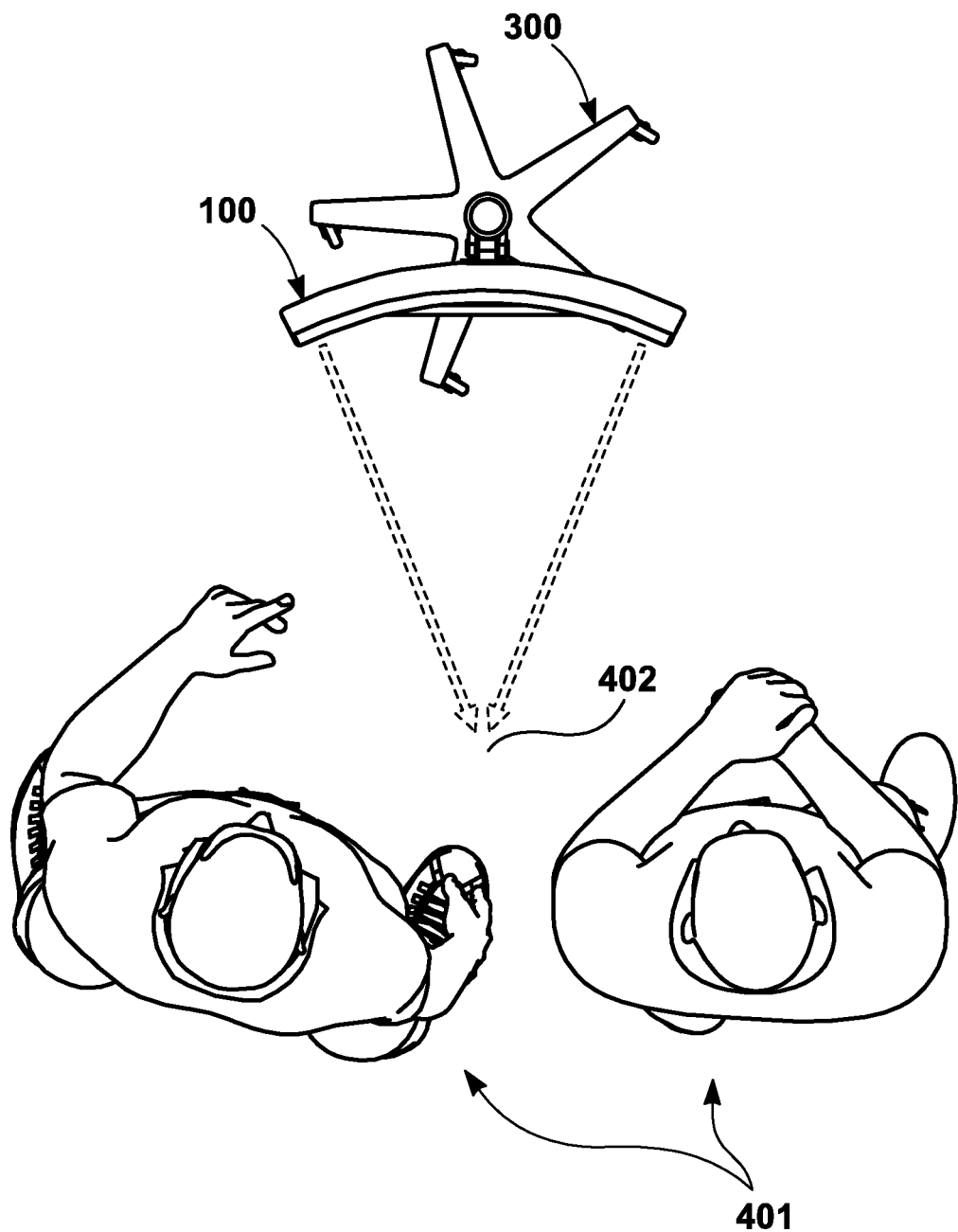
FIG. 3B illustrates a top view of the plurality of users using the parabolic-shaped receptacle via the movable stand as illustrated in FIG. 3A.

FIG. 3B illustrates a top view of the plurality of users 401 using the parabolic-shaped receptacle 100 via the movable stand 300 as illustrated in FIG. 3A. An audio focal point 402 is illustrated at an optimal distance from the parabolic-shaped receptacle 100 (e.g., approximately five feet) to effectively focus the audio emanating from the computing device 200 (FIG. 2A) toward the plurality of users 200.

The parabolic-shaped receptacle 100 may have a variety of parabolic curvatures along different axes to filter noise emanating from the parabolic-shaped receptacle 100 and being received by the parabolic-shaped receptacle 100. For instance, the parabolic-shaped receptacle 100 illustrated in FIG. 1A has two parabolic curvatures: a parabolic curvature around an x-axis (e.g., vertical curvature of corners) and a parabolic curvature around a y-axis (e.g., horizontal curvature illustrated in FIG. 1B).

Figure 4A:
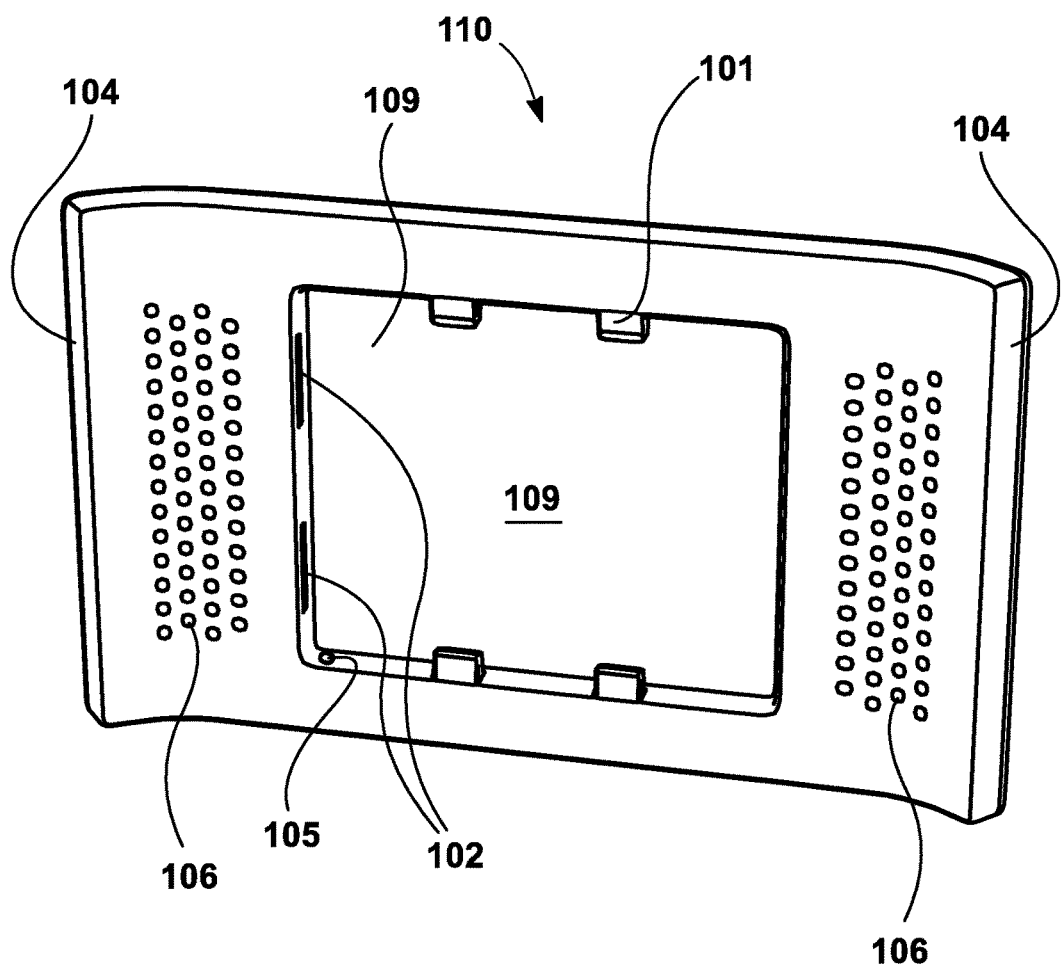
FIG. 4A illustrates a perspective view of a parabolic-shaped receptacle that only has curvature around a y-axis with partially-shaped parabolas.
Figure 4B:
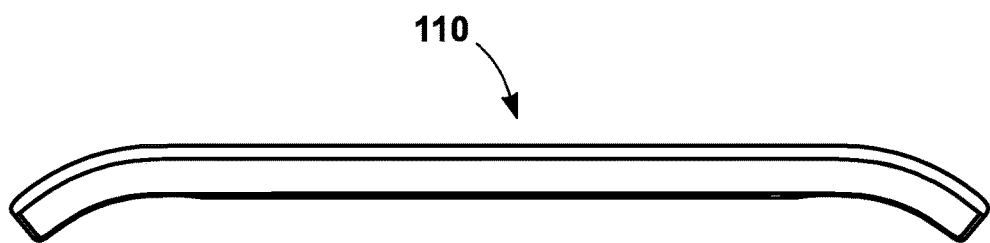
FIG. 4B illustrates at top view of the curvature around the y-axis of the parabolic-shaped receptacle.

As an alternative embodiment, FIG. 4A illustrates a perspective view of a parabolic-shaped receptacle 110 that only has curvature around a y-axis with partially-shaped parabolas. In other words, the corners are not curved toward the user around an x-axis. Further, the parabolic-shaped receptacle 110 may only have curvature for the right and left portions of the parabolic-shaped receptacle 100 such that the portion of the parabolic-shaped receptacle 100 to the rear of the cavity 109 is flat. FIG. 4B illustrates at top view of the curvature around the y-axis of the parabolic-shaped receptacle 110.

Figure 5A:
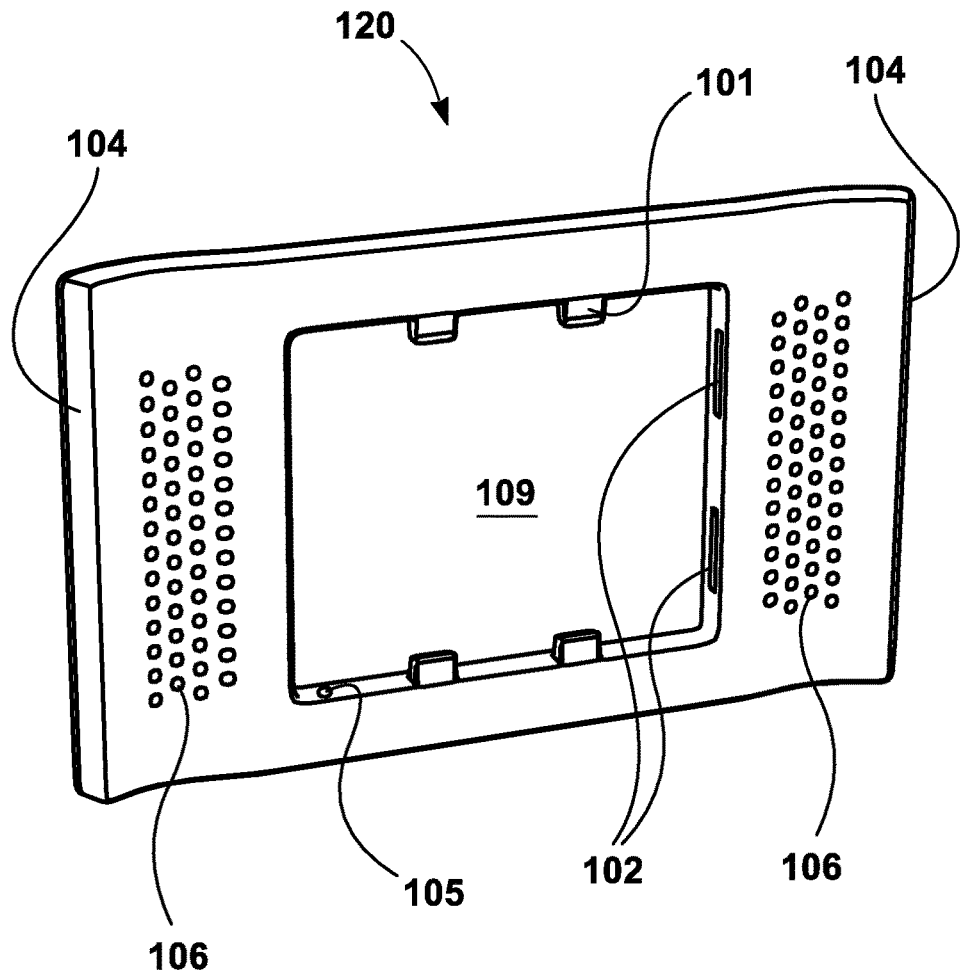
FIG. 5A illustrates a perspective view of a parabolic-shaped receptacle that only has curvature around a y-axis but with fully-shaped parabolas.
Figure 5B:
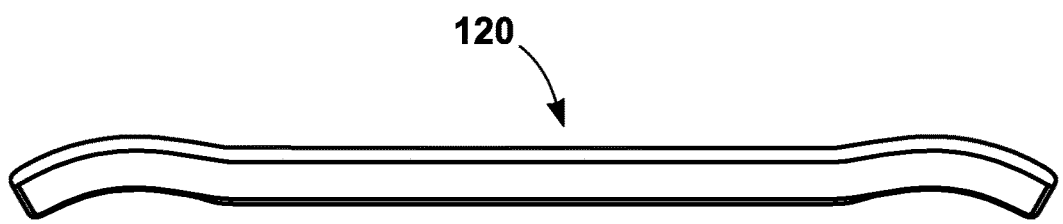
FIG. 5B illustrates at top view of the curvature around the y-axis of the parabolic-shaped receptacle.

As yet another alternative embodiment, FIG. 5A illustrates a perspective view of a parabolic-shaped receptacle 120 that only has curvature around a y-axis but with fully-shaped parabolas. FIG. 5B illustrates at top view of the curvature around the y-axis of the parabolic-shaped receptacle 120.

Figure 5C:
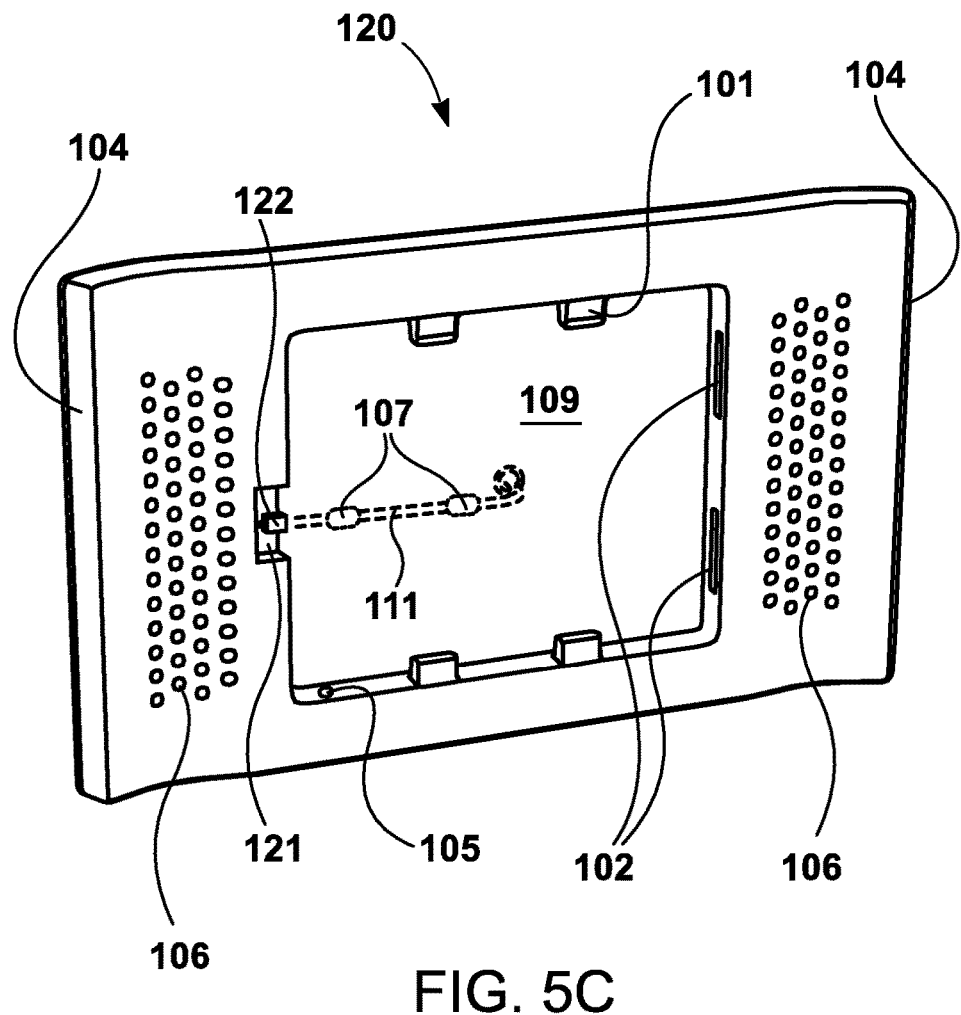
FIG. 5C illustrates a perspective view of an example of a power cord management configuration implemented for the parabolic-shaped receptacle illustrated in FIG. 5A.

Further, FIG. 5C illustrates a perspective view of an example of a power cord management configuration implemented for the parabolic-shaped receptacle 120 illustrated in FIG. 5A. A recess 121 allows for plugging in the cable 111 (FIG. 1B) via a plug 122. Alternatively, an enclosed compartment, which may or may not be capable of being opened, may be used for the plug 122.

Figure 5D:
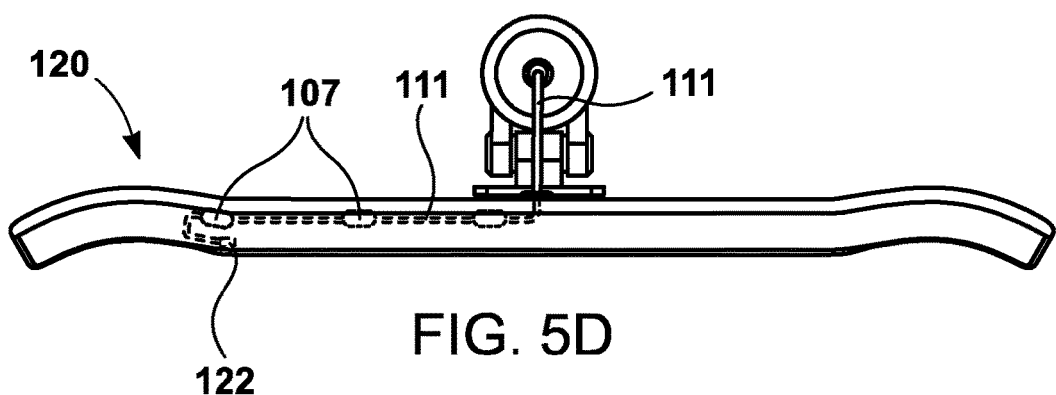
FIG. 5D illustrates a top view of the power cord management configuration illustrated in FIG. 5C.

In addition, FIG. 5D illustrates a top view of the power cord management configuration illustrated in FIG. 5C. The cable 111 enters the parabolic-shaped receptacle 120 externally and is maintained in an unkinked manner (e.g., straight, curved, etc.) in the wire channel 107 after entering the wire channel 107. The cable 111 may then curve after exiting the wire channel 107 to then be plugged into the computing device 200 (FIG. 2A).

The wire channel 107 may be an internal tube, a series of fasteners (e.g., clamps, clips, etc.), or other holding mechanism for maintaining the cable 111 without kinking. As a result, the cable 111 is maintained in an optimal position for operability with minimal wear and tear.

Further, the wire channel 107 may be positioned on the surface of the cavity 109 behind where the computing device 200 (FIG. 2A) is positioned. Alternatively, the wire channel 107 may be positioned beneath a top layer of the cavity 109 on which the computing device 200 is positioned.

The power cord management configuration may be implemented with any of the parabolic-shaped receptacles 100, 110, and 120. For example, the wire channel 107 may conform to the shape of the parabolic-shaped receptacle 100, 110, or 120.

Accordingly, a variety of types of parabolas may be used along different portions of the parabolic-shaped receptacle 120 and around one or more different axes; such variations may be used to provide different types of audio quality to the plurality of users 401.

Figure 6A:
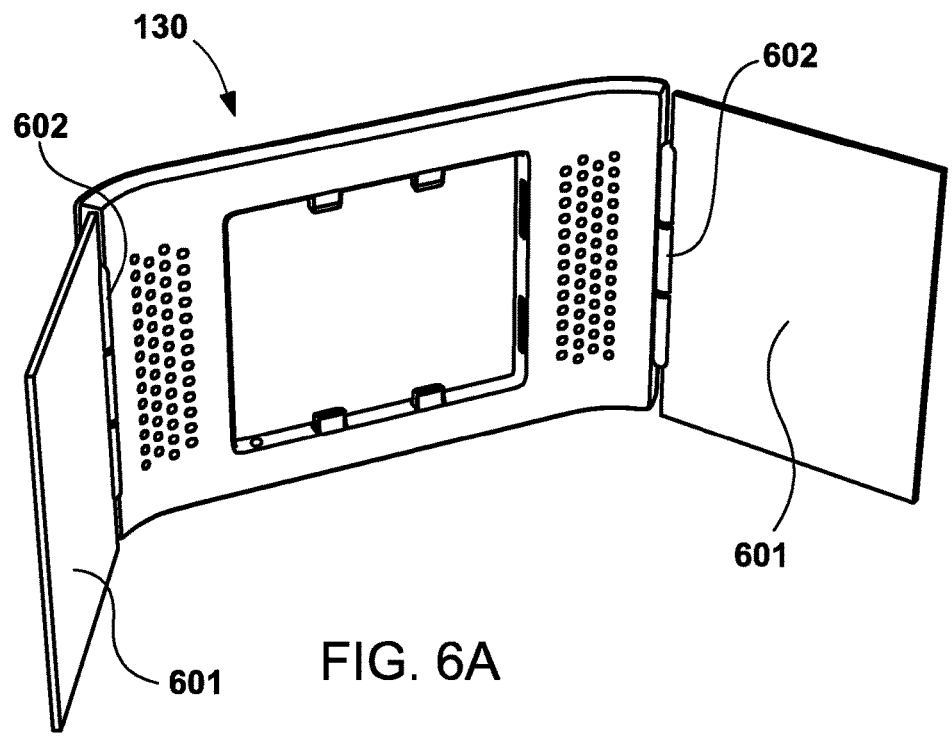
FIG. 6A illustrates a perspective view of a configuration in which an additional device may be integrated in or attached to the any of the parabolic-shaped receptacles to provide additional privacy.

Further, FIG. 6A illustrates a perspective view of a configuration in which an additional device may be integrated in or attached to the any of the parabolic-shaped receptacles 100, 110, and 120 to provide additional privacy. For example, FIG. 6A illustrates a plurality of panels 601 that may be attached to the parabolic-shaped receptacle 130 (FIG. 5A) via one or more hinges 602; accordingly, the plurality of panels 601 may be adjusted (e.g., via inward or outward rotation) to prevent other customers, representatives, etc. from viewing or hearing the content emanating from the computing device 200 (FIG. 2A). Further, the plurality of panels 601 may enhance the focusing and filtering aspects of the audio being delivered to the plurality of users 401 (FIG. 3A). In addition, the plurality of panels 601 may enhance the quality of the audio being delivered from the plurality of users 401 to the computing device 200 (FIG. 2A) by focusing that audio even more toward the computing device 200 and filtering more external noise from surrounding customers, representatives, etc.

The panels 601 may be attached to the parabolic-shaped receptacle 100 via coupling mechanisms (e.g., clips, fasteners, etc.) other than the hinges 602. Further, the panels 601 may move in directions other than the illustrated inward or outward rotation (e.g., folding, extending, retracting, etc.).

Figure 6B:
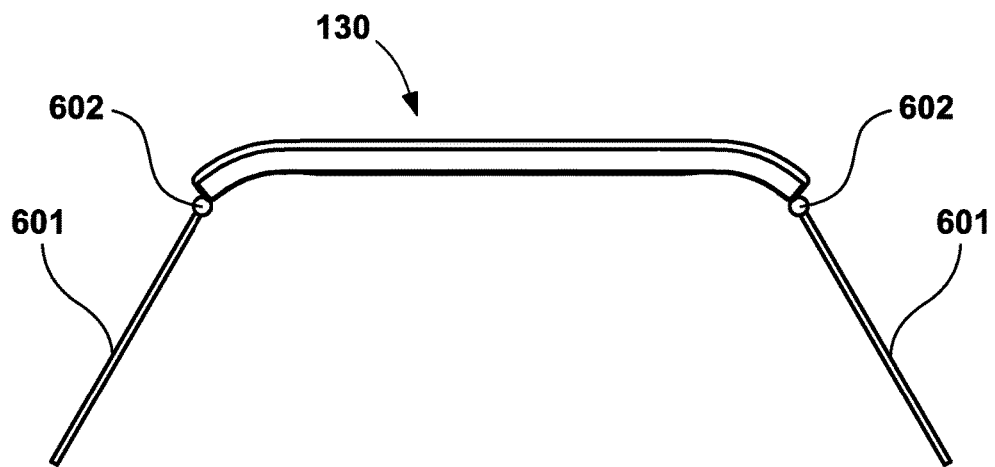
FIG. 6B illustrates a top view of the configuration illustrated in FIG. 6A.
Figure 6C:
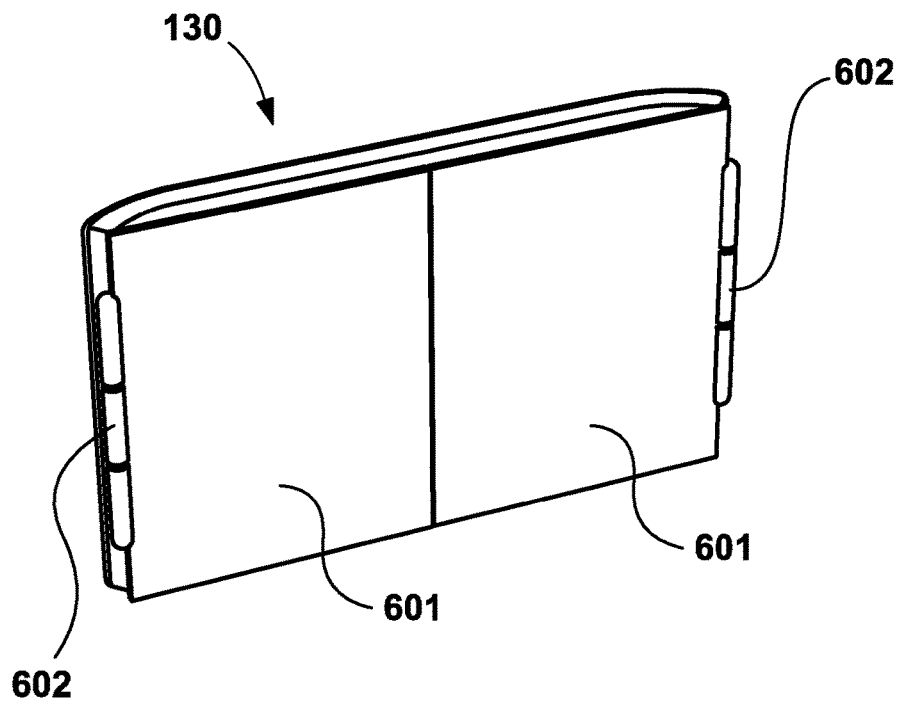
FIG. 6C illustrates a perspective view of the configuration illustrated in FIG. 6A in which the panels are fully rotated inward toward the parabolic-shaped receptacle.
Figure 6D:
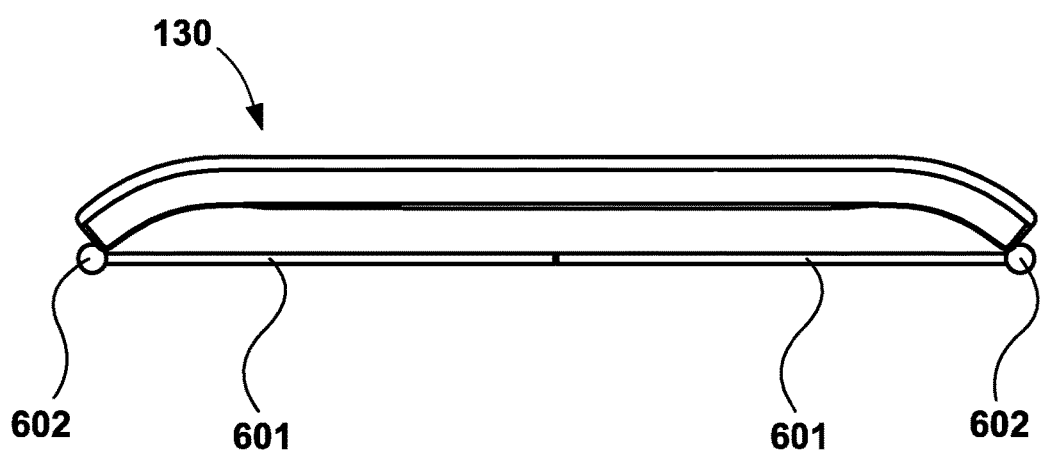
FIG. 6D illustrates a top view of the configuration illustrated in FIG. 6C.

Further, FIG. 6B illustrates a top view of the configuration illustrated in FIG. 6A. FIG. 6C illustrates a perspective view of the configuration illustrated in FIG. 6A in which the panels 601 are fully rotated inward toward the parabolic-shaped receptacle 130; such positioning of the panels 601 may provide a screen cover to detect a hibernation mode for the computing device 200. In addition, FIG. 6D illustrates a top view of the configuration illustrated in FIG. 6C.

A computer is herein intended to include any device that has a general, multi-purpose or single purpose processor as described above. For example, a computer may be a PC, laptop computer, set top box, cell phone, smartphone, tablet device, smart wearable device, portable media player, video player, etc.

It is understood that the apparatuses described herein may also be applied in other types of apparatuses. Those skilled in the art will appreciate that the various adaptations and modifications of the embodiments of the apparatuses described herein may be configured without departing from the scope and spirit of the present computer apparatuses. Therefore, it is to be understood that, within the scope of the appended claims, the present apparatuses may be practiced other than as specifically described herein.

We claim:

1. A parabolic-shaped receptacle comprising:
   a frame having a left side that has a left parabolic curvature and a right side that has a right parabolic curvature;
   one or more speaker ports;
   a coupling mechanism that couples a computing device to the frame such that one or more speakers of the computing device are aligned with the one or more speakers ports to deliver audio from the one or more speakers through the one or more speaker ports;
   a left receptacle speaker positioned on the frame along the left parabolic curvature to the left of the one or more speaker ports, the left receptacle speaker receiving the audio from the one or more speaker ports and delivering the audio to one or more users positioned in front of the left parabolic curvature; and
   a right receptacle speaker positioned on the frame along the right parabolic curvature to the right of the one or more speaker ports, the right receptacle speaker receiving the audio from the one or more speaker ports and delivering the audio to the one or more users positioned in front of the right parabolic curvature.

2. The parabolic-shaped receptacle of claim 1, wherein the left parabolic curvature and the right parabolic curvature are curved around an x-axis.

3. The parabolic-shaped receptacle of claim 1, wherein the left parabolic curvature and the right parabolic curvature are curved around a y-axis.

4. The parabolic-shaped receptacle of claim 1, wherein the left parabolic curvature and the right parabolic curvature are curved such that the left receptacle speaker and the right receptacle speaker deliver the audio to an audio focal point in proximity to the one or more users.

5. The parabolic-shaped receptacle of claim 1, wherein the computing device is a tablet device.

6. The parabolic-shaped receptacle of claim 1, wherein the computing device is a smartphone.

7. The parabolic-shaped receptacle of claim 1, wherein the coupling mechanism couples the computing device to a cavity in the frame such that a perimeter of the computing device is encapsulated by a perimeter of the frame.

8. The parabolic-shaped receptacle of claim 7, wherein the one or more speaker ports are at least partially located in one or more sides of the cavity.

9. The parabolic-shaped receptacle of claim 7, wherein the one or more speaker ports are at least partially located in a rear side of the cavity.

10. A parabolic-shaped receptacle comprising:
    a frame having a left side that has a left parabolic curvature and a right side that has a right parabolic curvature;
    one or more speaker ports;
    a coupling mechanism that couples a computing device to the frame such that one or more speakers of the computing device are aligned with the one or more speakers ports to deliver audio from the one or more speakers through the one or more speaker ports;
    a left receptacle speaker positioned on the frame along the left parabolic curvature to the left of the one or more speaker ports, the left receptacle speaker receiving the audio from the one or more speaker ports and delivering the audio to one or more users positioned in front of the left parabolic curvature;
    a right receptacle speaker positioned on the frame along the right parabolic curvature to the right of the one or more speaker ports, the right receptacle speaker receiving the audio from the one or more speaker ports and delivering the audio to the one or more users positioned in front of the right parabolic curvature;
    a left privacy panel;

a left privacy panel coupling mechanism that couples the left panel to the frame such that the left panel is positioned to deflect audio emanating from the left receptacle speaker toward the one or more users;
a right privacy panel; and
a right privacy panel coupling mechanism that couples the right panel to the frame such that the right panel is positioned to deflect audio emanating from the right receptacle speaker toward the one or more users.

11. The parabolic-shaped receptacle of claim 10, wherein the left privacy panel coupling mechanism is a left hinge that rotates the left privacy panel inwardly toward the frame and outwardly away from the frame, and the right privacy panel coupling mechanism is a right hinge that rotates the right privacy panel inwardly toward the frame and outwardly away from the frame.

12. The parabolic-shaped receptacle of claim 10, wherein the left privacy panel and the right privacy panel activate a hibernation mode when rotated inwardly toward the frame such that a display screen of the computing device is obfuscated by the left privacy panel and the right privacy panel.

13. The parabolic-shaped receptacle of claim 10, wherein the left parabolic curvature and the right parabolic curvature are curved around an x-axis.

14. The parabolic-shaped receptacle of claim 10, wherein the left parabolic curvature and the right parabolic curvature are curved around a y-axis.

15. The parabolic-shaped receptacle of claim 10, wherein the left parabolic curvature and the right parabolic curvature are curved such that the left receptacle speaker and the right receptacle speaker deliver the audio to an audio focal point in proximity to the one or more users.

16. The parabolic-shaped receptacle of claim 10, wherein the computing device is a tablet device.

17. The parabolic-shaped receptacle of claim 10, wherein the computing device is a smartphone.

18. The parabolic-shaped receptacle of claim 10, wherein the coupling mechanism couples the computing device to a cavity in the frame such that a perimeter of the computing device is encapsulated by a perimeter of the frame.

19. The parabolic-shaped receptacle of claim 18, wherein the one or more speaker ports are at least partially located in one or more sides of the cavity.

* * * * *